Jan. 22, 1952 G. STRYSKO 2,583,397

AUTOMATIC CONTROL FOR TEMPERATURE CONTROLLING SYSTEMS

Filed Oct. 23, 1948 3 Sheets-Sheet 1

INVENTOR
GEORGE STRYSKO

BY Arthur P. Cyr
ATTORNEY

Jan. 22, 1952 G. STRYSKO 2,583,397

AUTOMATIC CONTROL FOR TEMPERATURE CONTROLLING SYSTEMS

Filed Oct. 23, 1948 3 Sheets-Sheet 2

INVENTOR
GEORGE STRYSKO
BY Arthur P. Cyi
ATTORNEY

AUTOMATIC CONTROL FOR TEMPERATURE CONTROLLING SYSTEMS

Filed Oct. 23, 1948 3 Sheets-Sheet 3

| OUT-SIDE TEMP. °F / TIME | 5:00 | 5:30 | 6:00 | 6:30 | 7:00 | 7:30 | 8:00 | 8:30 | 9:00 | 9:30 | 10:00 | 10:30 | 11:00 | 11:30 | 12:00 | 12:30 | 1:00 | 1:30 |
|---|---|---|---|---|---|---|---|---|---|---|---|---|---|---|---|---|---|---|
| 35 OR BELOW | | V | V | V | V | V | | | V | | | V | | | V | | | V |
| 35-40 | | V | V | V | V | V | | | V | | | V | | | V | | | |
| 40-45 | | | V | V | V | V | | | | V | | | | V | | | | V |
| 45-50 | | | | V | V | V | | | | X | | | | | X | | | |
| 50-55 | | | | V | V | V | | | | X | | | | | X | | | |
| 55-60 | | | | V | V | | | | | | | | | | X | | | |

| OUT-SIDE TEMP. °F / TIME | 2:00 | 2:30 | 3:00 | 3:30 | 4:00 | 4:30 | 5:00 | 5:30 | 6:00 | 6:30 | 7:00 | 7:30 | 8:00 | 8:30 | 9:00 | 9:30 | 10:00 | 10:30 |
|---|---|---|---|---|---|---|---|---|---|---|---|---|---|---|---|---|---|---|
| 35 OR BELOW | | | V | | | V | | | V | | V | | | V | | | | |
| 35-40 | V | | | | V | | | | V | | V | | | V | | | | |
| 40-45 | | | | V | | | | V | | | V | V | V | | | | | |
| 45-50 | | X | | | | V | V | V | | | V | V | | | | | | |
| 50-55 | | X | | | | | X | X | | | V | V | | | | | | |
| 55-60 | | | | | | X | X | X | | | | | | | | | | |

INVENTOR
GEORGE STRYSKO
BY Arthur P. Cyr
ATTORNEY

Patented Jan. 22, 1952 2,583,397

UNITED STATES PATENT OFFICE 2,583,397

AUTOMATIC CONTROL FOR TEMPERATURE CONTROLLING SYSTEMS

George Strysko, Flushing, N. Y.

Application October 23, 1948, Serial No. 56,237

11 Claims. (Cl. 236—46)

This invention relates to new and useful improvements in temperature controlling apparatus and more particularly to means for automatically controlling the operation of central or zone controlled heating plants or other temperature controlling apparatus employed in apartment houses, office buildings and the like.

It is an object of the present invention to provide a new and improved control system for temperature controlling apparatus of the character described by means of which the operation of the temperature controlling apparatus will be automatically regulated in accordance with the outdoor temperature.

Another object of the invention is to provide an automatic control system of this character having means constructed and arranged to provide for the temperature controlling apparatus a plurality of operating schedules predetermined to meet the requirements of the building at respectively different outdoor temperatures, and separate means constructed and arranged to selectively control the operating schedules of said first named means in accordance with the outdoor temperatures.

A further object of the invention is the provision of a novel control system adaptable to any central or zone-controlled heating system and having a clock-operated mechanism constructed and arranged to provide for the heating system a plurality of heating schedules predetermined to meet the heating requirement at respectively different outdoor temperatures and having also a thermostat device responsive to outdoor temperatures and cooperating with the clock-operated mechanism to selectively control the heating schedules of said heating system.

The above and other objects of the invention will become more apparent from the following description when taken in conjunction with the accompanying drawings which illustrate a preferred form of the invention. It is to be understood, however, that the invention is not limited to the specific details and arrangements shown but may employ various changes and modifications within the scope of the appended claims.

In the drawings in which numerals of like character have been used to designate similar parts throughout the several views, Fig. 1 is a diagrammatic view of a steam heating system having associated therewith an automatic control system embodying the present invention;

Figure 1:
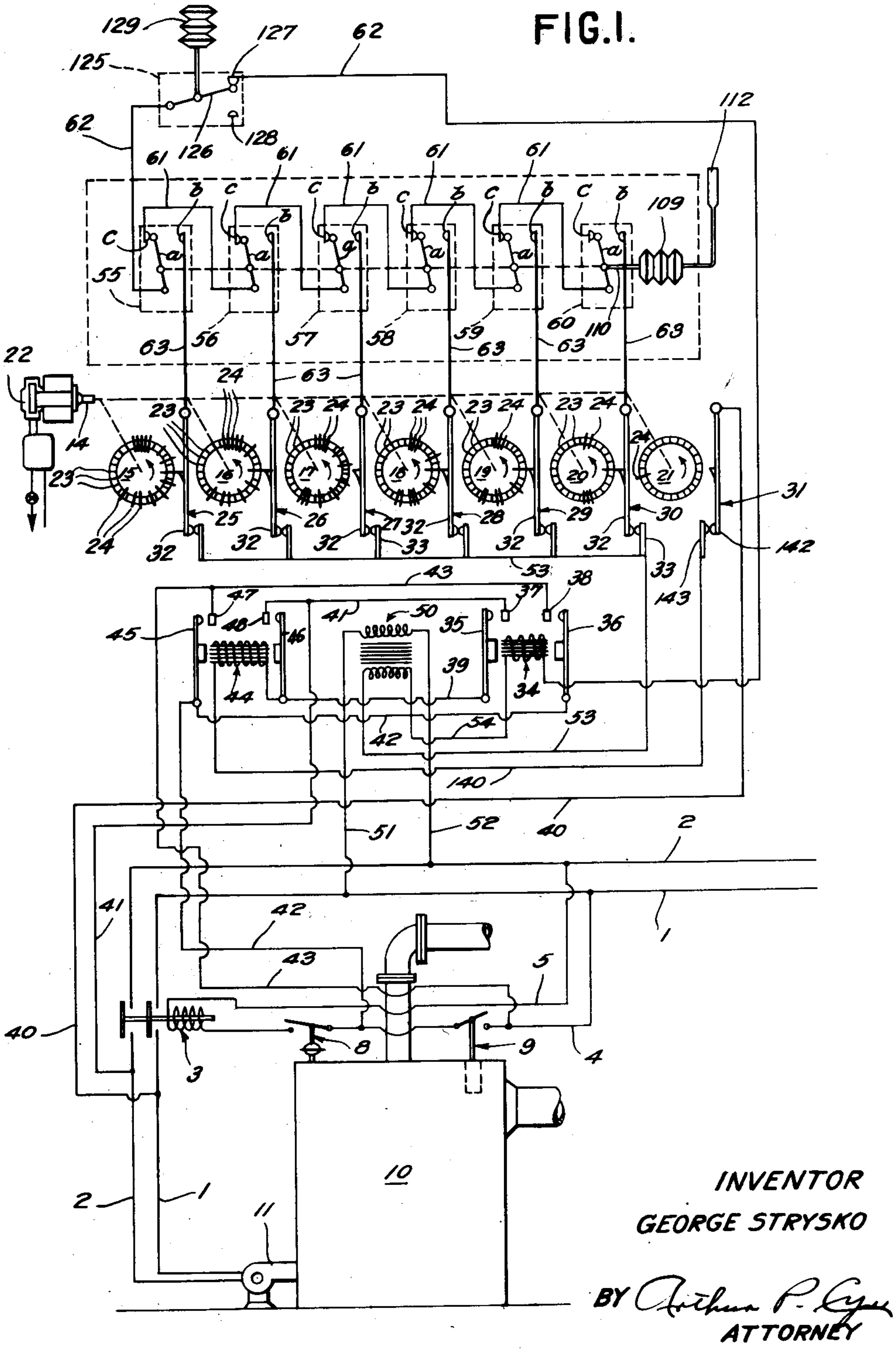

Referring to the drawings and more particularly to the installation shown in the diagram of Fig. 1, reference numeral 10 designates the boiler of a heating system or central heating plant such as employed in large apartment houses, hotels, office buildings and the like for supplying steam, hot water, or hot air to the various rooms (not shown). The boiler may be fired by coal, gas or other suitable fuel, that shown by way of example, comprising a motor-operated oil burner unit 11 fed from a suitable source of fuel oil (not shown). The motor of the burner unit 11 is connected by means of electrical conductors 1 and 2 to a source of current of suitable voltage.

Interposed in the motor circuit 1—2 is an electro-magnetic switch 3 of well-known construction for controlling the operation of the burner unit 11. The switch 3 is normally open and is adapted to be closed by an energizing circuit formed by conductors 4 and 5 connected to the source of current.

Where a steam heating system is employed as in the installation shown, the boiler 10 is provided with the usual limit switches 8 and 9 interposed in the energizing circuit 4—5 for controlling the operation of the electromagnetic switch 3 which in turn controls the operation of the burner unit 11. Limit switch 8 is responsive to the steam pressure in the boiler 10 and operates to break the energizing circuit 4—5 when the steam pressure reaches a predetermined point such as to insure that all of the radiators of the steam heating system receive their full quota of steam heat. On the other hand, limit switch 9 is responsive to the water temperature in the boiler 10 and operates to break the energizing circuit 4—5 when the water temperature reaches a predetermined value so as to provide a constant supply of hot water.

It is desirable in installations of the type hereinabove described to operate the system in accordance with the requirements of the building being heated. As well known, the heating requirements vary at different times of the day and night and also vary at different outdoor temperatures. For example, in an apartment house, between the hours of ten or eleven o'clock at night and four or five o'clock in the morning, comprising the sleeping hours of the tenants, the heating requirements are materially less than those over a corresponding period of time during the day. Likewise, when the outdoor temperature is relatively high, the heating requirements are less than when the outdoor temperature is relatively low.

However, with each of the limit switches 8 and 9 operating to break the energizing circuit 4—5 for the electromagnetic switch 3 and with the limit switch or "Aquastat" 9 operating at a predetermined water temperature in the boiler 10, it is necessary to render the limit switch 9 ineffective to break the energizing circuit 4—5 whenever it is desired to meet the heating requirements of the building. Moreover, in order to prevent unnecessary operation of the burner unit 11 beyond the requirements of the building being heated, it is advantageous to interrupt operation of the burner unit independent of the steam limit switch 8.

Consequently, and in accordance with the present invention, I employ a new and improved control system including a clock-operated switch mechanism having means constructed and arranged to render the limit switch 9 ineffective to break the energizing circuit 4—5 during predetermined periods and provide during such periods a plurality of operating schedules for the burner unit 11 predetermined to meet the requirements of the building at respectively different outdoor temperatures, and separate means constructed and arranged to interrupt operation of the burner unit 11 at a predetermined time independent of the steam limit switch 8, and a thermostat-operated switch mechanism responsive to outdoor temperatures and having means constructed and arranged to selectively control the operating schedules provided by the first named means of said clock-operated switch mechanism.

The clock-operated switch mechanism comprises a plurality of schedule discs 15, 16, 17, 18, 19, 20 and 21 mounted coaxially on a shaft 14 driven by a synchronous motor 22 at the rate of one revolution per twenty-four hours. Each schedule disc is provided on one or both of its faces with suitable indicia or calibrations to indicate the hours of the day and night. For purposes of illustration, the schedule discs have been shown in the diagram of Fig. 1 in front elevation and arranged in a row. The schedule discs 15 to 21 are axially spaced from one another on the shaft 14 and are each provided with a circumferential series of radial slots 23 (Fig. 2) arranged at predetermined spaced intervals with respect to one another. In the arrangement shown, the slots 23 in each of the schedule discs 15 to 21 are arranged at thirty minute intervals and are each adapted to receive a removable schedule pin 24.

Figures 3, 5:
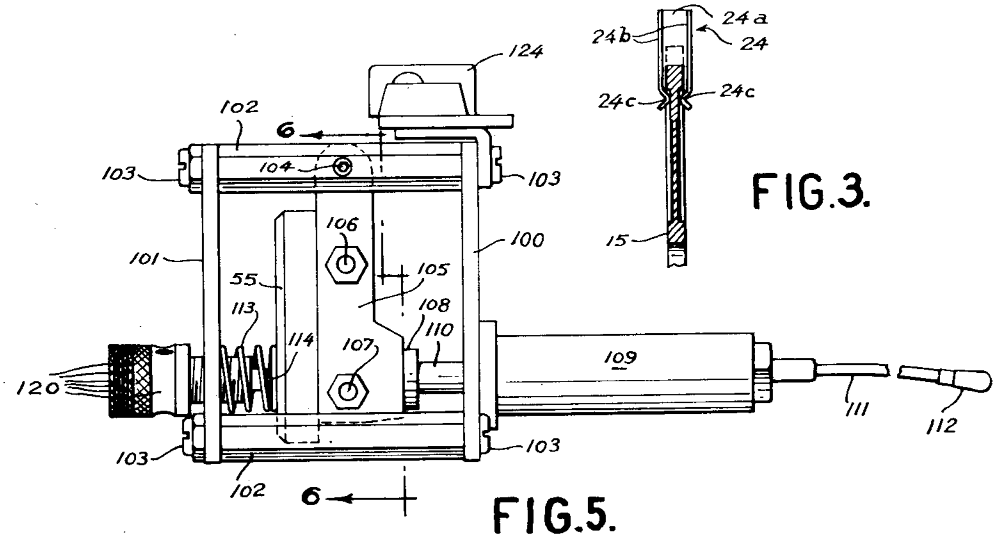
Fig. 3 is a sectional view taken on line 3—3 of Fig. 2.
Fig. 5 is an end view of the thermostat-operated switch mechanism forming part of the control system.
Figures 2, 4, 6:
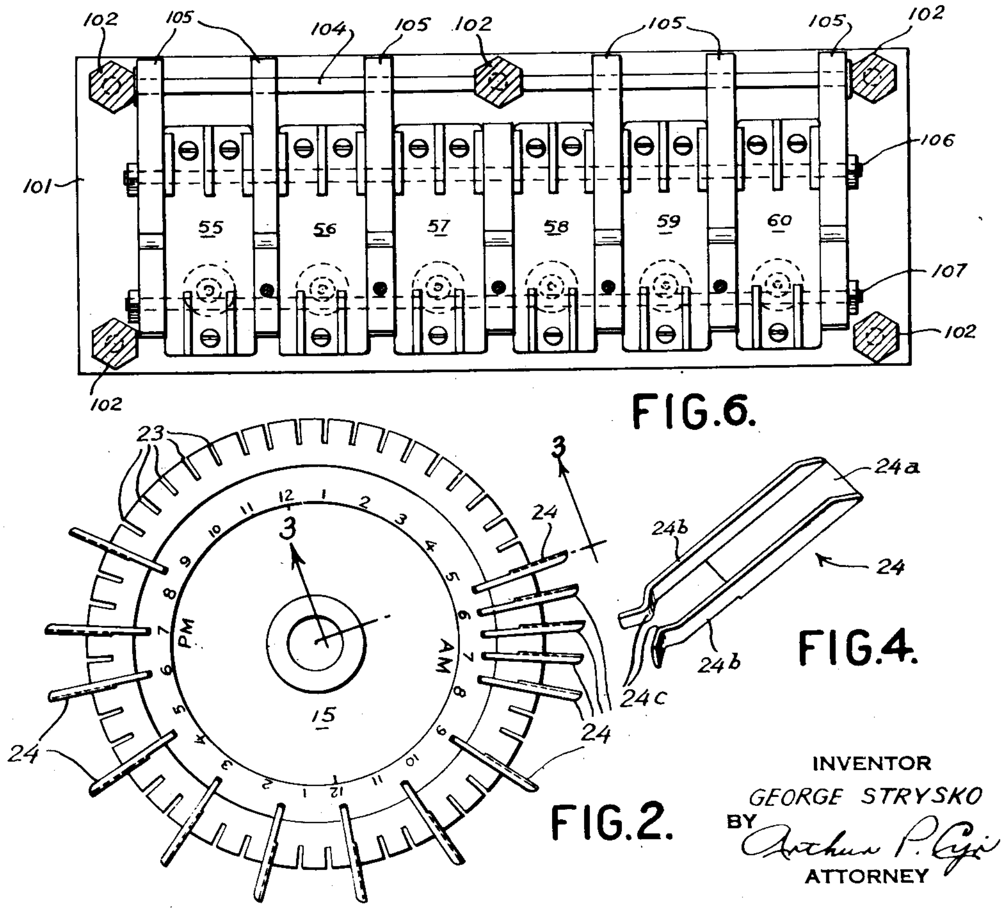
Fig. 2 is an enlarged detail view of one of the schedule discs employed in the control system.
Fig. 4 is a detail perspective view of one of the schedule pins employed in conjunction with each schedule disc.
Fig. 6 is a sectional view taken on line 6—6 of Fig. 5.

As best seen in Figs. 2, 3 and 4, each pin 24 is formed as a channel member having a web **24*a* adapted to be inserted in a selected slot 23 of a respective schedule disc with the legs 24*b* on each side of the web acting as guides to prevent lateral displacement of the pin in the slot. The legs 24*b* of each pin 24 are extended longitudinally beyond the inner end of the web 24*a* and are provided adjacent their free ends with inwardly bent portions or recesses 24*c*** for cooperative frictional engagement with the adjacent faces of a respective schedule disc.

The number of schedule pins 24 employed and the arrangement or setting thereof in the slots 23 of each of the discs 15 to 20 are dependent upon and determined by the heating requirements and the heating schedules to be provided to meet such heating requirements. For example, in connection with schedule disc 15 which in the installation shown is employed to provide a heating schedule predetermined to meet the heating requirements when the outdoor temperature is 35° F. or below, fourteen schedule pins 24 are employed arranged as shown in Fig. 2.

In connection with schedule disc 16 employed to provide a heating schedule predetermined to meet the heating requirements when the outdoor temperature is 35° F.–40° F., thirteen schedule pins are employed arranged in the slots corresponding respectively to 5:30 a. m., 6:00 a. m., 6:30 a. m., 7:00 a. m., 9:00 a. m., 10:30 a. m., 12:00 noon, 2:00 p. m., 4:00 p. m., 6:00 p. m., 7:00 p. m., and 8:30 p. m.

In connection with schedule disc 17 employed to meet the heating requirements when the outdoor temperature is 40° F.–45° F., twelve schedule pins are employed arranged respectively at 6:00 a. m., 6:30 a. m., 7:00 a. m., 7:30 a. m., 9:30 a. m., 11:30 a. m., 1:30 p. m., 3:30 p. m., 5:30 p. m., 7:00 p. m., 7:30 p. m., and 8:30 p. m.

In connection with schedule disc 18 employed to meet the heating requirements when the outdoor temperature is 45° F.–50° F., eleven schedule pins are employed arranged respectively at 6:30 a. m., 7:00 a. m., 7:30 a. m., 9:30 a. m., 12:00 noon, 2:30 p. m., 4:30 p. m., 5:00 p. m., 5:30 p. m., 7:00 p. m., and 7:30 p. m.

In connection with schedule disc 19 employed to meet the heating requirements when the outdoor temperature is 50° F.–55° F., ten schedule pins are employed arranged respectively at 6:30 a. m., 7:00 a. m., 7:30 a. m., 9:30 a. m., 12:00 noon, 2:30 p. m., 5:00 p. m., 7:00 p. m., and 7:30 p. m.

In connection with schedule disc 20 employed to meet the heating requirements when the outdoor temperature is 55° F.–60° F., six schedule pins are employed arranged respectively at 6:30 a. m., 7:00 a. m., 12:00 noon, 4:30 p. m., 5:00 p. m., and 5:30 p. m.

In connection with schedule disc 21 which is employed to prevent operation of the heating system beyond a predetermined period, a single schedule pin is employed arranged in the slot corresponding to 11:00 p. m.

Cooperating with the schedule discs 15 to 21, inclusive, is a plurality of switches 25, 26, 27, 28, 29, 30 and 31, respectively. Each of the switches 25 to 30, inclusive, is normally open and has a movable contact arm 32 arranged in the path of travel of each pin 24 on a respective schedule disc and adapted to be moved thereby into circuit-closing position with a complementary fixed contact 33 to control the operation of a starting relay 34 employed to shunt the limit switch 9 out of the energizing circuit 4—5. On the other hand, the switch 31 is normally closed and has a movable contact arm 142 arranged in the path of movement of each pin 24 on the disc 21 and is adapted to be moved thereby into circuit-opening position with respect to a complementary fixed contact 143 to control the operation of a holding relay 44 employed to maintain the limit switch 9 shunted out of the energizing circuit 4—5 as will later appear.

The starting relay 34 has a pair of movable contact arms 35 and 36 adapted to cooperate with a complementary pair of stationary contacts 37 and 38, respectively. The contact arm 35 is connected by conductor 39 to the coil of the holding relay 44, which in turn is connected by conductor 140 to the stationary contact 143 of the normally closed switch 31, the movable contact arm 142 of which is connected by conductor 40 to one of the terminals of the motor of the oil burner unit 11, while the complementary stationary contact 37 is connected by conductor 41 to the other terminal of said motor so as to provide an energizing circuit for the holding relay 44. The contact arm 36 is connected by conductor 42 to one side of the limit switch 9 while its complementary stationary contact 38 is connected by conductor 43 to the other side of said limit switch to shunt the latter out of the circuit 4—5 for the electromagnetic switch 3 whenever the starting relay 34 is energized as will later appear.

The holding relay 44 is likewise provided with a pair of movable contact arms 45 and 46 adapted to cooperate with a complementary pair of contacts 47 and 48, respectively. The contact arm 45 is connected to the conductor 42 while its complementary stationary contact 47 is connected to the conductor 43 to maintain the "Aquastat" or limit switch 9 shunted out of the energizing circuit 4—5 so long as the holding relay 44 remains energized. The movable contact arm 46 is connected to the conductor 39 while its complementary stationary contact 48 is connected to the conductor 41 to maintain the holding relay 44 energized until the energizing circuit 4—5 is broken by the steam pressure switch 8 or, alternatively, until the clock-operated switch 31 operates to break the energizing circuit of the holding relay 44 which in turn will open the shunt circuit 42—43 and enable the "Aquastat" or limit switch 9 to break the energizing circuit 4—5.

50 designates a step-down transformer, the primary winding of which is connected by conductors 51 and 52 to the power lines 1 and 2, respectively, of the current source. The secondary winding of the transformer 50 is connected by conductor 53 to the stationary contact 33 of each of the clock-operated switches 25 to 30 inclusive. The secondary winding of the transformer 50 is also connected by conductor 54 to the coil of the starting relay 34. In this manner, a source of relatively low voltage current is provided for operating the starting relay 34.

The relays 34 and 44, transformer 50 and clock-operated mechanism including the motor 22, schedule discs 15 to 21 and switches 25 to 31 are all preferably located adjacent the boiler room of the heating plant and, for convenience, may all be mounted on a common panel board (not shown).

The circuit through each of the switches 25–30 inclusive is selectively controlled by the thermostat-operated switch mechanism hereinabove referred to, arranged at a convenient location outside the building being heated, preferably on the north side of the latter so as to be sheltered from the direct rays of the sun. As shown in Fig. 1, the thermostat-operated switch mechanism comprises a plurality of double-pole single-throw switches 55 to 60 inclusive, operating at respectively different temperatures and adapted to be actuated in sequence upon changes in outdoor temperature as hereinafter described.

Each of the switches 55–60 is of the well-known micro-movement type having a movable contact arm *a* normally maintained in engagement with a fixed contact *b* and movable to a position in engagement with a fixed contact *c* upon a temperature rise above a predetermined value which, in the installation shown, is 35° F. for switch 55, between 35° F. and 40° F. for switch 56, between 40° F. and 45° F. for switch 57, between 45° F. and 50° F. for switch 58, between 50° F. and 55° F. for switch 59, and between 55° F. and 60° F. for switch 60. Each of the switches 55–59 has its fixed contact *c* connected by conductor 61 to the movable contact arm *a* of an adjacent switch operating at a higher temperature while the movable contact arm *a* of switch 55 operating at the lowest temperature is connected by conductor 62 to the coil of the starting relay 34 so that the circuit to a switch operating at a higher temperature is made through a switch operating at a lower temperature as shown in Fig. 1. In connection with switch 60 which operates at the highest temperature, contact *c* is a dead terminal having no electrical connection to any other switch. The other fixed contact *b* of each of the switches 55 to 60 is connected by a conductor 63 to the movable contact arm 32 of a respective switch 25, 26, 27, 28, 29 and 30 of the clock-operated switch mechanism.

As shown in Figs. 5–8, the micro-type switches 55–60 are arranged in a unitary assembly comprising a rectangular frame formed by a pair of plate members 100 and 101 maintained in spaced parallel relationship by means of supports 102 disposed one at each corner and one at the back intermediate the ends of the frame. The plates 100 and 101 are secured to the supports 102 by means of screws 103.

Extending longitudinally along the rear of the frame through aligned openings provided in the supports 102 intermediate the ends of the latter is a rod 104 providing a pivotal support for a plurality of spacer arms 105 arranged one on each side of the micro-type switches 55–60. The spacer arms 105 are rigidly secured to the switches 55–60 by means of bolts 106 and 107 extending transversely therethrough in suitable openings provided therein. Adjacent the front of the frame, the spacer arms 105 project below the micro-type switches 55–60 for engagement with a pressure plate 108 which extends transversely across the same and is screwed or otherwise suitably secured thereto for movement as a unit.

Mounted on the outer face of the plate 100 is a bellows diaphragm assembly 109 of well-known construction having a plunger 110 extending through a suitable opening provided in the plate 100 and cooperating with the pressure plate 108. The bellows diaphragm assembly 109 is connected by conduit 111 to a thermal bulb 112 filled with a suitable fluid adapted to expand and contract upon a rise and fall of the temperature affecting the bulb. The pressure plate 108 is urged against the free end of the plunger 110 by means of a spring 113 interposed between the plate member 101 and one of the micro-type switches 55–60 as shown, to provide a predetermined loading pressure against the bellows diaphragm 109.

Figures 7, 9:
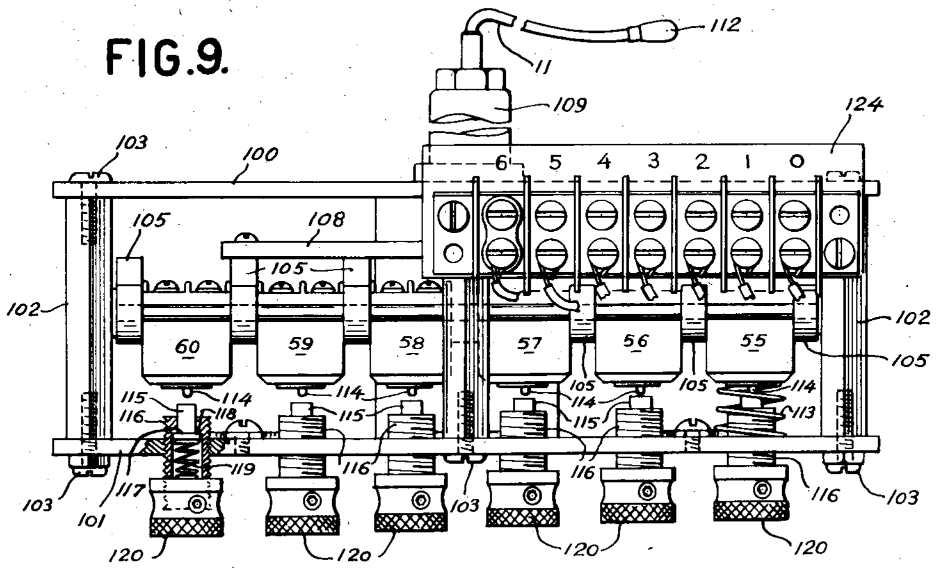
Fig. 7 is a side elevational view of the thermostat-operated switch mechanism with certain parts shown in section.
Fig. 9 is a time-temperature chart.
Figure 8:
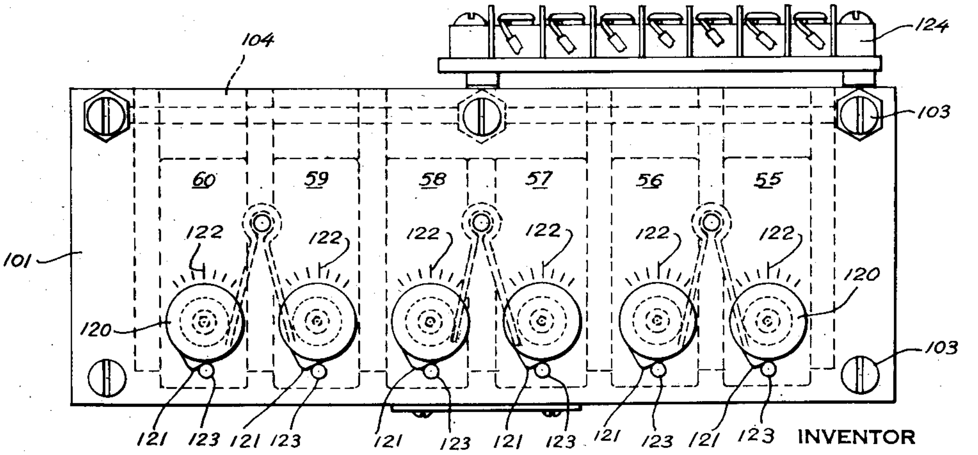
Fig. 8 is a top plan view of the thermostat-operated switch mechanism.

The micro-type switches 55–60 are disposed with their actuating buttons 114 facing the plate 101 for cooperation with a plurality of abutment pins 115 arranged at different relative positions with respect thereto as shown in Fig. 7 for operation of said switches at respectively different temperatures.

In order to enable the switches 55–60 to operate in sequence upon a temperature rise or a temperature drop affecting the thermal bulb 112, each abutment pin 115 is slidably mounted in a tubular sleeve 116. Each sleeve 116 is counterbored as shown to accommodate the enlarged head 117 formed on the inner end of a respective abutment pin 115 and provide a stop 118 therefor. Each abutment pin 115 projects outwardly beyond the inner end of a respective sleeve 116 and is normally maintained with its head 117 in engagement with its associated stop 118 by means of a coil spring 119 under sufficient tension to overcome the resistance offered by the actuating button 114 of a respective switch but insufficient to overcome the pressure of the bellows diaphragm assembly 109.

Each sleeve 116 is preferably threaded as shown and cooperates with a threaded opening provided in the plate 101 so that by simple adjustment of the sleeve relative to the plate, each abutment pin 115 may be moved relative to the actuating button 114 of a respective switch for operation of the latter at any predetermined temperature. For facilitating such adjustment, each sleeve 116 is provided on its outer end with an adjusting knob 120 having an index finger 121 for cooperation with suitable calibrations 122 on the outer face of the plate 101. If desired, stop pins 123 may be employed for the index fingers 121 to prevent adjustment of the sleeves 116 beyond certain limits determined by the extent of travel of the actuating buttons of the respective switches and the extent of movement of the plurality of switches as a unit by the plunger 110 of the bellows diaphragm assembly 109.

Suitably mounted on one of the frame plates 100 and 101 is a terminal block 124 which is employed to facilitate connecting the contact *b* of the micro-type switches 55–60 to the contact arm 32 of each of the clock-operated switches 25–30, respectively, and the movable contact *a* of micro-type switch 55 to the coil of the starting relay 34.

In addition to the thermostat-operated switches 55–60 just described for selectively controlling the heating schedules provided by the clock-operated switches 25–30, it may be desirable and advantageous to employ a thermostat switch adapted to be influenced by the direct rays of the sun and operating at a predetermined temperature to interrupt the energizing circuit of the starting relay 34 and thus prevent unnecessary operation of the heating system to heat the building when the amount of heat supplied by solar radiation is sufficient to meet the heating requirements. Such an arrangement is shown in Fig. 1 in which 125 designates a thermostat switch device interposed in the conductor 62 and having a movable contact arm 126 (Fig. 1) normally maintained in circuit-closing position with respect to a complementary stationary contact 127 and adapted to be moved into circuit-opening position with an abutment 128 by a bellows or other movable element 129 of a thermostat. The thermostat device 125 is preferably located on the roof of the building where it will receive the direct rays of the sun for the greatest length of time and may be set for operation at any predetermined temperature according to local conditions. For example, in the installation shown, I have found it advantageous to set the thermostat device 125 for operation to interrupt the circuit through the conductor 62 whenever the temperature due to solar radiation rises above 45° F. In other words, upon a rise in temperature above 45° F. the movable contact arm 126 will be actuated by the bellows 129 to interrupt the circuit through conductor 62.

Having described a preferred embodiment of my automatic control system in connection with a steam heating system, its operation is as follows:

Assume that the outdoor temperature is 35° F. or below, the plunger 110 of the bellows diaphragm assembly 109 will be retracted so that the movable contact arm *a* of each of the micro-type switches 55–60 of the thermostat-operated switch mechanism will be in engagement with its complementary fixed contact *b*. As the schedule discs 15–20 of the clock-operated switch mechanism rotate, a circuit will be completed through the micro-type switch 55 and the clock-operated switch 25 whenever the latter is actuated by a schedule pin 24 on the schedule disc 15 to energize the starting relay 34. Upon energizing the relay 34, the "Aquastat" or limit switch 9 on the boiler 10 will be shunted out of the energizing circuit 4—5 for the electro-magnetic switch 3 by means of the conductors 42 and 43 to initiate operation of the burner 11, or continue operation of the latter as the case may be, dependent upon the water temperature in the boiler 10 as affecting the "Aquastat" 9, at the time the relay 34 is energized.

Upon operation of the burner 11, the holding relay 44 will be energized by a circuit formed by conductor 39, 41 through the switch contacts 35, 37 of the starting relay 34 and connected to one of the terminals of the burner unit 11, and conductor 40 connected to the other terminal of the burner 11 through the clock-operated night shut-down switch 31. Once the holding relay 44 has been energized as above described, it will continue to be energized to maintain the "Aquastat" switch 9 shunted out of the energizing circuit 4—5 by means of the conductors 42, 43 through relay contacts 45, 47 until the pressure in the boiler 10 has reached the predetermined value for which the steam limit switch 8 has been set to break the energizing circuit 4—5 of the electro-magnetic switch 3 and interrupt operation of the burner 11.

Thus, once the burner unit has been set into operation by the starting relay 34, it will continue in operation until the heating cycle is completed, following which the holding relay 44 will be deenergized and will remain deenergized until the starting relay 34 is again energized by actuation of switch 25 of the clock-operated switch mechanism.

The foregoing sequence of operations is repeated each time the clock-operated switch 25 is actuated by a schedule pin 24 on the schedule disc 15. Following actuation of the switch 25 by the last schedule pin 24 on the disc 15, should the burner 11 continue to operate uninterrupted until the night shut-down switch 31 is actuated by the pin 24 on the schedule disc 21, the shunt circuit through the conductor 40 will be broken so as to enable the "Aquastat" switch 9 to break the energizing circuit 4—5 for the electro-magnetic switch 3 and interrupt operation of the burner unit 11.

In the event the outdoor temperature rises above the level for which the micro-type switch 55 has been set, its contact arm *a* will be shifted by the plunger 110 of the bellows diaphragm assembly 109 into engagement with its complementary contact *c* to establish a circuit for the starting relay 34 through a succeeding micro-type switch operating at a higher temperature and a respective switch of the clock-operated switch mechanism. Should the outdoor temperature rise above the level for which the switch 60 (operating at the highest temperature) has been set so that its contact arm *a* is in engagement with its contact *c* which, as before mentioned, is a "dead" terminal, the circuit to the starting relay 34 will be interrupted to prevent operation of the heating system to heat the building.

While I have described the operation of the control system without reference to the thermostat device 125, it will be understood that whenever the contact arm 126 thereof is shifted into engagement with the abutment 128 by the thermostatic bellows 129 upon expansion of the latter due to solar heat radiation, the circuit to the starting relay 34 through the thermostat-operated switches 55–60 and the clock-operated switches 25–30 will be interrupted to prevent operation of the heating system.

The time-temperature chart of Fig. 9 clearly illustrates the operation of the control system herein described in which the letter "*v*" indicates each time the heating plant is set into operation by actuation of respective clock-operated switches 25–30 at a predetermined outdoor temperature for which the respective theremostat-operated micro-type switches 55–60 have been set. On the other hand, the letter "*x*" on the chart indicates each time the heating plant will be set into operation by actuation of respective clock-operated switches 25–30 at the predetermined outdoor temperature for which respective thermostat-operated micro-type switches 55–60 have been set unless otherwise prevented by the thermostat device 125.

It will be seen from the foregoing that I have provided a novel control system having a clock-operated mechanism and a thermostat-operated mechanism by means of which the operation of a heating plant or other temperature controlling apparatus will be automatically controlled in accordance with the requirements at different times of the day and night and at different ambient temperatures.

It will also be observed that by employing for the clock-operated mechanism a plurality of schedule discs each provided with a series of slots for the reception of removable schedule pins to actuate a respective switch, and by employing for the thermostat-operated mechanism a plurality of individually adjustable switches, the control system has a high degree of flexibility, enabling it to be set to schedule the operation of the temperature controlling unit not only for any hour of the day but also for any ambient temperature.

While I have described my control system in connection with a steam heating system, it is obvious that the same may be used in connection with other types of heating systems or other temperature controlling apparatus.

From the foregoing, it is believed that the construction, operation and advantages of my invention will be readily understood by those skilled in the art without further description, it being borne in mind that numerous changes may be made in the details disclosed without departing from the spirit and scope of the following claims.

What I claim is:

1. In a temperature controlling system of the class described having an electrically operated temperature controlling unit, control means for said system comprising, in combination, an energizing circuit for said temperature controlling unit, means including a starting relay having a first switch adapted when actuated to close said energizing circuit, a second circuit for energizing said starting relay, a plurality of switches arranged in parallel in said second circuit, time control means including a plurality of rotatable discs, one for each of said switches, means for rotating said discs continuously at a predetermined speed, switch actuating means on each of said discs constructed and arranged to close a respective switch at predetermined periods during each revolution of said discs, thermostat means responsive to outdoor temperatures having a plurality of switches arranged in said second circuit and operating at respectively different temperatures for selectively controlling the current in said second circuit through said first-named switches, a holding relay having a first switch adapted when actuated to maintain said first circuit closed, said starting relay having a second switch adapted when actuated to complete an energizing circuit to said holding relay, said holding relay having a second switch adapted when actuated to maintain said last named energizing circuit closed, and means including a switch responsive to a predetermined condition in said system and operating a critical condition attained during operation of said system to open said first-named and last named energizing circuits.

2. In a temperature controlling system of the class described having an electrically operated temperature controlling unit, control means for said system comprising, in combination, an energizing circuit for said temperature controlling unit, means including a starting relay having a first switch adapted when actuated to close said energizinz circuit, a second circuit for energizing said starting relay, a plurality of switches arranged in parallel in said second circuit, time control means including a plurality of rotatable discs, one for each of said switches, means for rotating said discs continuously at a predetermined speed, switch actuating means on each of said discs constructed and arranged to close a respective switch at predetermined periods during each revolution of said discs, thermostat means responsive to outdoor temperatures having a plurality of switches arranged in said second circuit and operating at respectively different temperatures for selectively controlling the current in said second circuit through said first-named switches, other thermostat means arranged to be influenced by solar heat radiation and having a switch operating at a predetermined temperature to open said second circuit, a holding relay having a first switch adapted when actuated to maintain said first circuit closed, said starting relay having a second switch adapted when actuated to complete an energizing circuit to said holding relay, said holding relay having a second switch adapted when actuated to maintain said last named energizing circuit closed, and means including a switch responsive to a predetermined condition in said system and operating a critical condition attained during operation of said system to open said first-named and last named energizing circuits.

3. In a temperature controlling system of the class described having an electrically operated temperature controlling unit, control means for said system comprising, in combination, an energizing circuit for said temperature controlling unit, means including a starting relay having a first switch adapted when actuated to close said energizing circuit, a second circuit for energizing said starting relay, a plurality of switches arranged in parallel in said second circuit, time control means including a plurality of rotatable discs, one for each of said switches, means for rotating said discs continuously at a predetermined speed, switch actuating means on each of said discs constructed and arranged to close a respective switch at predetermined periods during each revolution of said discs, thermostat means responsive to outdoor temperatures having a plurality of switches arranged in said second circuit and operating at respectively different temperatures for selectively controlling the current in said second circuit through said first-named switches, a holding relay having a first switch adapted when actuated to maintain said first circuit closed, said starting relay having a second switch adapted when actuated to complete an energizing circuit to said holding relay, said holding relay having a second switch adapted when actuated to maintain said last named energizing circuit closed, means including a switch responsive to a predetermined condition in said system and operating a critical condition attained during operation of said system to open said first-named and last named energizing circuits, and means including a time-controlled switch constructed and arranged to open said last named energizing circuit whereby to effect opening of said first-named energizing circuit independent of said last named means.

4. In a temperature controlling system of the class described having an electrically operated temperature controlling unit, control means for said system comprising, in combination, an energizing circuit for said temperature controlling unit, means including a starting relay having a first switch adapted when actuated to close said energizing circuit, a second circuit for energizing said starting relay, a plurality of switches arranged in parallel in said second circuit, time control means including a plurality of rotatable discs, one for each of said switches, means for rotating said discs continuously at a predetermined speed, switch actuating means on each of said discs constructed and arranged to close a respective switch at predetermined periods during each revolution of said discs, thermostat means responsive to outdoor temperatures having a plurality of switches arranged in said second circuit and operating at respectively different temperatures for selectively controlling the current in said second circuit through said first-named switches, other thermostat means arranged to be influenced by solar heat radiation and having a switch operating at a predetermined temperature to open said second circuit, a holding relay having a first switch adapted when actuated to maintain said first circuit closed, said starting relay having a second switch adapted when actuated to complete an energizing circuit to said holding relay, said holding relay having a second switch adapted when actuated to maintain said last named energizing circuit closed, means including a switch responsive to a predetermined condition in said system and operating a critical condition attained during operation of said system to open said first-named and last named energizing circuits, and means including a time-controlled switch constructed and arranged to open said last named energizing circuit whereby to effect opening of said first-named energizing circuit independent of said last named means.

5. In a temperature controlling system of the class described having an electrically operated temperature controlling unit, control means for said system comprising, in combination, an energizing circuit for said temperature controlling unit, means including a starting relay having a first switch adapted when actuated to close said energizing circuit, a second circuit for energizing said starting relay, a plurality of switches arranged in parallel in said second circuit, time control means including a plurality of rotatable discs, one for each of said switches, means for rotating said discs continuously at a predetermined speed, settable switch actuating means on each of said discs constructed and arranged to close a respective switch at predetermined periods during each revolution of said discs, thermostat means responsive to outdoor temperatures having a plurality of switches arranged in said second circuit and operating at respectively different temperatures for selectively controlling the current in said second circuit through said first-named switches, a holding relay having a first switch adapted when actuated to maintain said first circuit closed, said starting relay having a second switch adapted when actuated to complete an energizing circuit to said holding relay, said holding relay having a second switch adapted when actuated to maintain said last named energizing circuit closed, and means including a switch responsive to a predetermined condition in said system and operating a critical condition attained during operation of said system to open said first-named and last named energizing circuits.

6. In a temperature controlling system of the clas described having an electrically operated temperature controlling unit, control means for said system comprising, in combination, a circuit for energizing said temperature controlling unit, an electromagnetic switch adapted when energized to close said circuit, a second circuit for energizing said electromagnetic switch having a plurality of switches connected in series including a minimum limit control switch and a maximum limit control switch, a starting relay having a first switch adapted when actuated to close a shunt circuit connected to said second circuit on each side of said minimum limit control switch, a third circuit for energizing said starting relay, a plurality of switches arranged in parallel in said third circuit, a plurality of rotatable discs, one for each of said switches, means for rotating said discs continuously at a predetermined speed, switch actuating means on each of said discs constructed and arranged to close a respective switch at predetermined periods during each revolution of said discs, thermostat means responsive to outdoor temperatures having a plurality of switches arranged in said third circuit and operating at respectively different temperatures for selectively controlling the current in said third circuit through said time-controlled switches, a holding relay having a first switch adapted when actuated to maintain said shunt circuit closed, and a fourth circuit for energizing said holding relay, said fourth circuit being controlled by said electromagnetic switch, said starting relay having a second switch adapted when actuated to close said fourth circuit, said holding relay having a second switch adapted when actuated to maintain said fourth circuit closed.

7. In a temperature controlling system of the class described having an electrically operated temperature controlling unit, control means for said system comprising, in combination, a circuit for energizing said temperature controlling unit, an electromagnetic switch adapted when energized to close said circuit, a second circuit for energizing said electromagnetic switch having a plurality of switches connected in series including a minimum limit control switch and a maximum limit control switch, a starting relay having a first switch adapted when actuated to close a shunt circuit connected to said second circuit on each side of said minimum limit control switch, a third circuit for energizing said starting relay, a plurality of switches arranged in parallel in said third circuit, a plurality of rotatable discs, one for each of said switches, means for rotating said discs continuously at a predetermined speed, switch actuating means on each of said discs constructed and arranged to close a respective switch at predetermined periods during each revolution of said discs, thermostat means responsive to outdoor temperatures having a plurality of switches arranged in said third circuit and operating at respectively different temperatures for selectively controlling the current in said third circuit through said time-controlled switches, other thermostat means arranged to be influenced by solar heat radiation and having a switch operating at a predetermined temperature to open said third circuit, a holding relay having a first switch adapted when actuated to maintain said shunt circuit closed, and a fourth circuit for energizing said holding relay, said fourth circuit being controlled by said electromagnetic switch, said starting relay having a second switch adapted when actuated to close said fourth circuit, said holding relay having a second switch adapted when actuated to maintain said fourth circuit closed.

8. In a temperature controlling system of the class described having an electrically operated temperature controlling unit, control means for said system comprising, in combination, a circuit for energizing said temperature controlling unit, an electromagnetic switch adapted when energized to close said circuit, a second circuit for energizing said electromagnetic switch having a plurality of switches connected in series including a minimum limit control switch and a maximum limit control switch, a starting relay having a first switch adapted when actuated to close a shunt circuit connected to said second circuit on each side of said minimum limit control switch, a third circuit for energizing said starting relay, a plurality of switches arranged in parallel in said third circuit, a plurality of rotatable discs, one for each of said switches, means for rotating said discs continuously at a predetermined speed, switch actuating means on each of said discs constructed and arranged to close a respective switch at predetermined periods during each revolution of said discs, thermostat means responsive to outdoor temperatures having a plurality of switches arranged in said third circuit and operating at respectively different temperatures for selectively controlling the current in said third circuit through said time-controlled switches, a holding relay having a first switch adapted when actuated to maintain said shunt circuit closed, a fourth circuit for energizing said holding relay, said fourth circuit being controlled by said electromagnetic switch, said starting relay having a second switch adapted when actuated to close said fourth circuit, said holding relay having a second switch adapted when actuated to maintain said fourth circuit closed, and means including a time-controlled switch constructed and arranged to open said fourth circuit independent of said electromagnetic switch.

9. In a temperature controlling system of the class described having an electrically operated temperature controlling unit, control means for said system comprising, in combination, a circuit for energizing said temperature controlling unit, an electromagnetic switch adapted when energized to close said circuit, a second circuit for energizing said electromagnetic switch having a plurality of switches connected in series including a minimum limit control switch and a maximum limit control switch, a starting relay having a first switch adapted when actuated to close a shunt circuit connected to said second circuit on each side of said minimum limit control switch, a third circuit for energizing said starting relay, a plurality of switches arranged in parallel in said third circuit, a plurality of rotatable discs, one for each of said switches, means for rotating said discs continuously at a predetermined speed, switch actuating means on each of said discs constructed and arranged to close a respective switch at predetermined periods during each revolution of said discs, thermostat means responsive to outdoor temperatures having a plurality of switches arranged in said third circuit and operating at respectively different temperatures for selectively controlling the current in said third circuit through said time-controlled switches, other thermostat means arranged to be influenced by solar heat radiation and having a switch operating at a predetermined temperature to open said third circuit, a holding relay having a first switch adapted when actuated to maintain said shunt circuit closed, a fourth circuit for energizing said holding relay, said fourth circuit being controlled by said electromagnetic switch, said starting relay having a second switch adapted when actuated to close said fourth circuit, said holding relay having a second switch adapted when actuated to maintain said fourth circuit closed, and means including a time-controlled switch constructed and arranged to open said fourth circuit independent of said electromagnetic switch.

10. In a temperature controlling system of the class described having an electrically operated temperature controlling unit, control means for said system comprising, in combination, a circuit for energizing said temperature controlling unit, an electromagnetic switch adapted when energized to close said circuit, a second circuit for energizing said electromagnetic switch having a plurality of switches connected in series including a minimum limit control switch and a maximum limit control switch, a starting relay having a first switch adapted when actuated to close a shunt circuit connected to said second circuit on each side of said minimum limit control switch, a third circuit for energizing said starting relay, a plurality of switches arranged in parallel in said third circuit, a plurality of rotatable discs, one for each of said switches, means for rotating said discs continuously at a predetermined speed, settable means on each of said discs constructed and arranged to close a respective switch at predetermined periods during each revolution of said discs, thermostat means responsive to outdoor temperatures having a plurality of switches arranged in said third circuit and operating at respectively different temperatures for selectively controlling the current in said third circuit through said time-controlled switches, a holding relay having a first switch adapted when actuated to maintain said shunt circuit closed, and a fourth circuit for energizing said holding relay, said fourth circuit being controlled by said electromagnetic switch, said starting relay having a second switch adapted when actuated to close said fourth circuit, said holding relay having a second switch adapted when actuated to maintain said fourth circuit closed.

11. In a heating system of the class described having a boiler and electrically operated heating means for said boiler, control means for said heating system comprising, in combination, a circuit for energizing said heating means, an electromagnetic switch adapted when energized to close said circuit, a second circuit for energizing said electromagnetic switch having a plurality of switches connected in series including a minimum limit control switch responsive to the water temperature in said boiler and operating to close said second circuit when the water temperature falls below a predetermined limit and a maximum limit control switch responsive to the pressure in said boiler and operating at a predetermined maximum pressure to open said second circuit, a starting relay having a first switch adapted when actuated to close a shunt circuit connected to said second circuit on each side of said minimum limit control switch, a third circuit for energizing said starting relay, a plurality of switches arranged in parallel in said third circuit, a plurality of rotatable discs, one for each of said switches, means for rotating said discs continuously at a predetermined speed, switch actuating means on each of said discs constructed and arranged to close a respective switch at predetermined periods during each revolution of said discs, thermostat means responsive to outdoor temperatures having a plurality of switches arranged in said third circuit and operating at respectively different temperatures for selectively controlling the current in said third circuit through said time-controlled switches, a holding relay having a first switch adapted when actuated to maintain said shunt circuit closed, and a fourth circuit for energizing said holding relay, said fourth circuit being controlled by said electromagnetic switch, said starting relay having a second switch adapted when actuated to close said fourth circuit, said holding relay having a second switch adapted when actuated to maintain said fourth circuit closed.

GEORGE STRYSKO.

REFERENCES CITED

The following references are of record in the file of this patent:

UNITED STATES PATENTS

| Number | Name | Date |
|---|---|---|
| 1,604,342 | Greenhut | Oct. 26, 1926 |
| 2,062,337 | Stewart | Dec. 1, 1936 |
| 2,083,612 | Midyette | June 15, 1937 |
| 2,157,817 | Cargo | May 9, 1939 |
| 2,192,859 | Scoggin | Mar. 5, 1940 |
| 2,256,797 | Walker | Sept. 23, 1941 |
| 2,275,427 | Greenlee | Mar. 10, 1942 |
| 2,376,482 | Guler et al. | May 22, 1945 |